Oct. 21, 1952 W. E. WITHALL 2,614,831
FRICTION SHOCK ABSORBER FOR TRUCKS OF RAILWAY CARS
Filed July 16, 1949
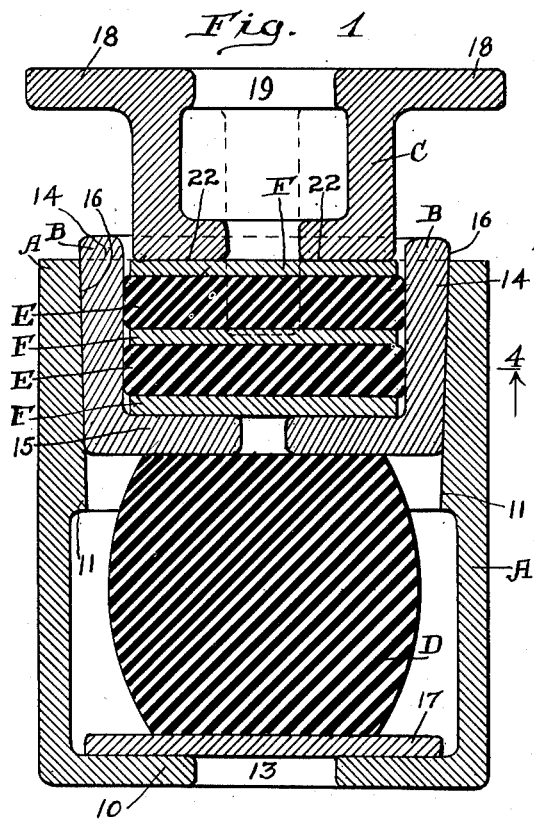
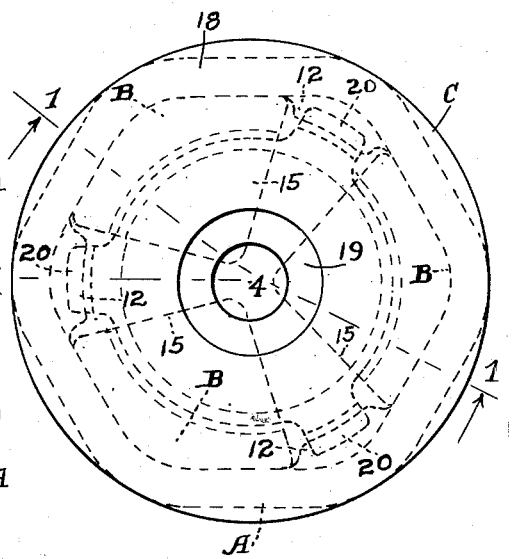
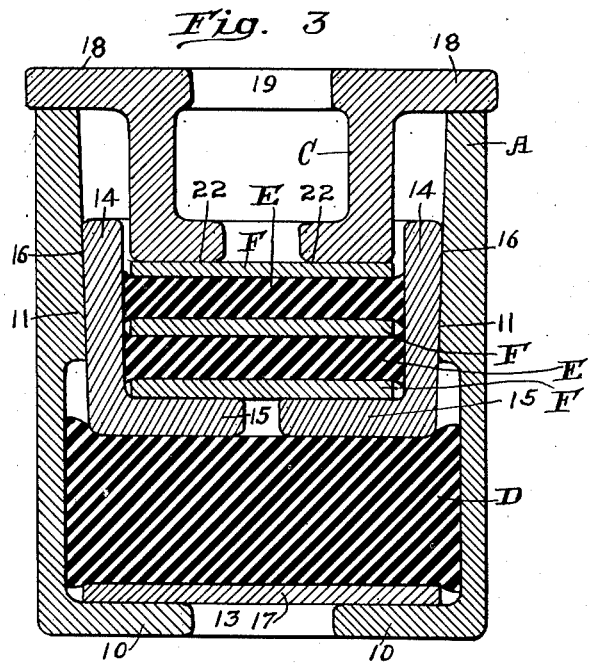
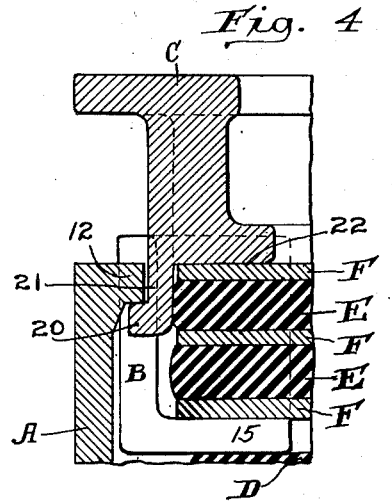
Inventor:
William E. Withall.
By Henry Fuchs.
Atty Patented Oct. 21, 1952

2,614,831

UNITED STATES PATENT OFFICE 2,614,831

FRICTION SHOCK ABSORBER FOR TRUCKS OF RAILWAY CARS

William E. Withall, Hinsdale, Ill., assignor to W. H. Miner, Inc., Chicago, Ill., a corporation of Delaware Application July 16, 1949, Serial No. 105,167

2 Claims. (Cl. 267—9)

1

This invention relates to improvements in friction shock absorbers especially adapted for dampening or snubbing the action of railway car truck springs.

One object of the invention is to provide a friction shock absorbing mechanism, comprising a friction casing, friction shoes slidingly telescoped within the casing, a rubber element yieldingly opposing movement of the shoes inwardly of the casing, a pressure transmitting member, and a rubber cushioning means compressible between said pressure transmitting member and shoes, adapted to be expanded in transverse direction when compressed to force said shoes against the friction surfaces of the casing.

A more specific object of the invention is to provide a mechanism as set forth in the preceding paragraph, wherein the rubber cushioning means, which is compressible between the pressure transmitting member and shoes, comprises a plurality of rubber discs alternated with metal spacing plates.

Other objects of the invention will more clearly appear from the description and claims hereinafter following.

In the accompanying drawing forming a part of this specification, Figure 1 is a vertical sectional view of my improved shock absorber, corresponding substantially to the line 1—1 of Figure 2. Figure 2 is a top plan view of Figure 1. Figure 3 is a view, similar to Figure 1, showing the mechanism fully compressed. Figure 4 is a broken, vertical sectional view, corresponding substantially to the line 4—4 of Figure 2.

As illustrated in the drawing, my improved shock absorber comprises broadly a friction casing A, three friction shoes B—B—B, a pressure transmitting plunger C, a rubber element D yieldingly opposing inward movement of the shoes, and a cushioning unit comprising a pair of radially expandible rubber pads E—E and spacing plates F—F—F, between the shoes and compressible by the plunger C to force the shoes radially apart against the friction surfaces of the casing.

The casing A is in the form of a tubular member of substantially hexagonal, transverse cross section. The casing A is open at its upper end and has a transverse bottom wall 10 at its lower end. At the upper end of the casing, the walls thereof are provided with interior, inwardly converging friction surfaces 11—11—11 of V-shaped, transverse cross section. The open upper end of the casing is further provided with three interior stop lugs 12—12—12, which are alternated with

2 the three friction surfaces. The bottom wall 10 of the casing is provided with a central opening 13 therethrough, adapted to accommodate the usual spring centering projections of the bottom spring plate of the cluster of truck springs of a railway car.

The three friction shoes B—B—B are of similar design, each shoe comprising an upstanding platelike section 14 of V-shaped, horizontal cross section, having an inwardly projecting, horizontal flange 15 at its lower end. The flange 15 is of substantially triangular outline, as shown most clearly in Figure 2. On its outer side, each shoe also presents a lengthwise extending friction surface 16 of V-shaped, transverse section, engaged with one of the V-shaped friction surfaces 11 of the casing A.

The rubber element D is disposed within the casing A, below the shoes B—B—B. The element D is in the form of an elongated, solid, cylindrical block, slightly tapered toward its top and bottom ends, as shown in Figure 1. The blocklike rubber element D is supported on a disc or plate 17, which, in turn, is supported on the wall 10 of the casing and closes the opening 13 of said wall. The upper end of the element D bears on the underneath sides of the flanges 15—15—15 of the shoes B—B—B.

The pressure transmitting plunger C is in the form of a hollow, cylindrical block having a laterally projecting, peripheral flange 18 at its upper end, overhanging the open upper end of the casing A. The plunger C projects downwardly toward the casing A and between the shoes B—B—B. The hollow plunger C presents a central opening 19 at its upper end of smaller diameter than the interior of the plunger, the opening 19 being adapted to receive the usual spring centering projection of the top spring follower plate of the spring cluster of a railway car truck. At the inner or bottom end, the plunger C has three laterally outwardly projecting, radial lugs 20—20—20, formed on depending fingers 21—21—21 on said plunger. The lugs 20—20—20 are alternated with the shoes B—B—B, and each lug extends between two adjacent shoes to engage in back of the corresponding lug 12 of the casing and restrict outward movement of the plunger C. The lower end face of the plunger C, which end face is indicated by 22, is engaged with the cushioning unit, which is composed of the pads E and E and the plates F—F—F.

The plates F are in the form of circular metal discs, alternated with the rubber pads E—E, the bottom plate F being supported and bearing on the flanges 15—15—15 of the three shoes B—B—B, the top plate F bearing on the flat bottom face 22 of the plunger C, and the third or intermediate plate F being interposed between the two rubber pads E—E.

The rubber pads E—E are of similar design, each pad being in the form of a circular disc or washer. As shown in Figure 1, the upper pad bears directly on the underneath side of the top plate F and the lower pad E bears directly on the bottom plate F. Each pad E is of greater diameter than the plates F and projects outwardly beyond the same in bearing contact with the inner sides of the shoes B—B—B.

My improved shock absorber preferably replaces one or more of the spring units of a truck spring cluster, being interposed between the top and bottom spring plates of said cluster.

The operation of my improved shock absorber is as follows: Upon the spring cluster of the truck of a railway car being compressed between the spring follower plates of the cluster, the plunger C is forced downwardly toward the casing A, compressing the rubber pads E—E between the plates F—F—F and forcing the shoes B—B—B inwardly of the casing against the resistance of the rubber element D. Compression of the pads E—E spreads the latter radially, forcing the shoes apart into tight frictional contact with the friction surfaces of the casing as they are carried inwardly along said friction surfaces, thus providing progressively increasing shock absorbing capacity. Compression of the shock absorber is finally limited, as illustrated in Figure 3, by engagement of the flange 18 of the plunger C with the upper end of the casing A, thus protecting the rubber pads E—E and the rubber element D against over-compression.

Upon reduction of the actuating pressure on the plunger C, as the truck springs recoil, the pressure upon the rubber pads E—E is reduced, permitting the same to contract radially, thereby reducing the radial pressure on the shoes and thus facilitating release of the mechanism, the shoes being returned to the normal full release position shown in Figure 1, by the lengthwise expansion of the rubber element D.

I claim:

1. In a friction shock absorber, the combination with a friction casing having interior friction surfaces at one end thereof; of friction shoes in sliding engagement with said friction surfaces; a rubber element within the casing yieldingly opposing inward movement of the shoes; inturned, horizontal flanges at the inner ends of said shoes; a spacing plate bearing on said flanges; a rubber pad bearing on said spacing plate; a second spacing plate bearing on said pad; a second rubber pad bearing on said second plate; a third spacing plate bearing on said second named pad; and a pressure transmitting plunger movable toward and away from said casing, the inner end of said plunger bearing on said third named spacing plate.

2. In a friction shock absorber, the combination with a friction casing having interior friction surfaces; of friction shoes slidable lengthwise on said friction surfaces, each shoe having an inwardly disposed flange; yielding means within the casing bearing on the flanges of said shoes and reacting between said casing and the flanges of said shoes for opposing inward movement of said shoes; rubber means between said shoes and supported by said flanges, said rubber means comprising rubber pads alternated with metal spacing plates, with one of said plates bearing on the flanges of said shoes; and pressure transmitting means engageable with said rubber means for compressing the same lengthwise against the flanges of said shoes.

WILLIAM E. WITHALL.

REFERENCES CITED

The following references are of record in the file of this patent:

UNITED STATES PATENTS

| Number | Name | Date |
|---|---|---|
| 1,933,034 | Sproul | Oct. 31, 1933 |
| 2,010,623 | Bugatti | Aug. 6, 1935 |
| 2,055,242 | Smith | Sept. 22, 1936 |
| 2,205,098 | Lamont | June 18, 1940 |
| 2,402,146 | Cardwell | June 18, 1946 |

FOREIGN PATENTS

| Number | Country | Date |
|---|---|---|
| 329,870 | Great Britain | May 29, 1930 |
| 620,246 | France | Jan. 15, 1927 |